United States Patent
Utsunomiya et al.

(10) Patent No.: US 8,831,135 B2
(45) Date of Patent: Sep. 9, 2014

(54) ADDRESS CONTROLLER, TRANSMITTER, AND ADDRESS CONTROL METHOD

(71) Applicant: Fujitsu Limited, Kawasaki (JP)

(72) Inventors: Yuichi Utsunomiya, Kawasaki (JP); Kazuo Nagatani, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/932,566

(22) Filed: Jul. 1, 2013

(65) Prior Publication Data

US 2014/0072074 A1    Mar. 13, 2014

(30) Foreign Application Priority Data

Sep. 12, 2012  (JP) .................................. 2012-201008

(51) Int. Cl.
| H04L 25/49 | (2006.01) |
| H04L 25/03 | (2006.01) |
| H04L 27/36 | (2006.01) |

(52) U.S. Cl.
CPC ........ *H04L 25/03343* (2013.01); *H04L 27/368* (2013.01)
USPC ...................................................... 375/296

(58) Field of Classification Search
USPC ......... 375/296–297; 455/67.11, 67.13, 114.2, 455/114.3
See application file for complete search history.

(56) References Cited

U.S. PATENT DOCUMENTS

| 7,106,806 | B1* | 9/2006 | Kenington ..................... 375/297 |
| 8,577,311 | B2* | 11/2013 | Wolf et al. ................. 455/114.3 |
| 2005/0073360 | A1* | 4/2005 | Johnson et al. ............... 330/149 |
| 2006/0190515 | A1 | 8/2006 | Okutani et al. |
| 2007/0296495 | A1 | 12/2007 | Shako et al. |
| 2012/0098596 | A1 | 4/2012 | Nagatani et al. |
| 2013/0015917 | A1* | 1/2013 | Ishikawa et al. ............. 330/149 |
| 2013/0083866 | A1* | 4/2013 | Masunaga et al. ............ 375/297 |

FOREIGN PATENT DOCUMENTS

| JP | 2006-079310 A | 3/2006 |
| JP | 2012-39235 A | 2/2012 |
| JP | 2012-090158 A | 5/2012 |
| WO | WO 2005/013105 A1 | 2/2005 |
| WO | WO 2006/095422 A1 | 9/2006 |

* cited by examiner

*Primary Examiner* — Khanh C Tran
(74) *Attorney, Agent, or Firm* — Arent Fox LLP

(57) ABSTRACT

An address controller includes: a plurality of lookup tables configured to hold values corresponding to a plurality of addresses; a similarity detector configured to detect similarity between the plurality of lookup tables and to group similar lookup tables among the plurality of lookup tables; and a controller configured to read the values out of the plurality of lookup tables grouped by the similarity detector, using address control information common to grouped lookup tables.

16 Claims, 14 Drawing Sheets

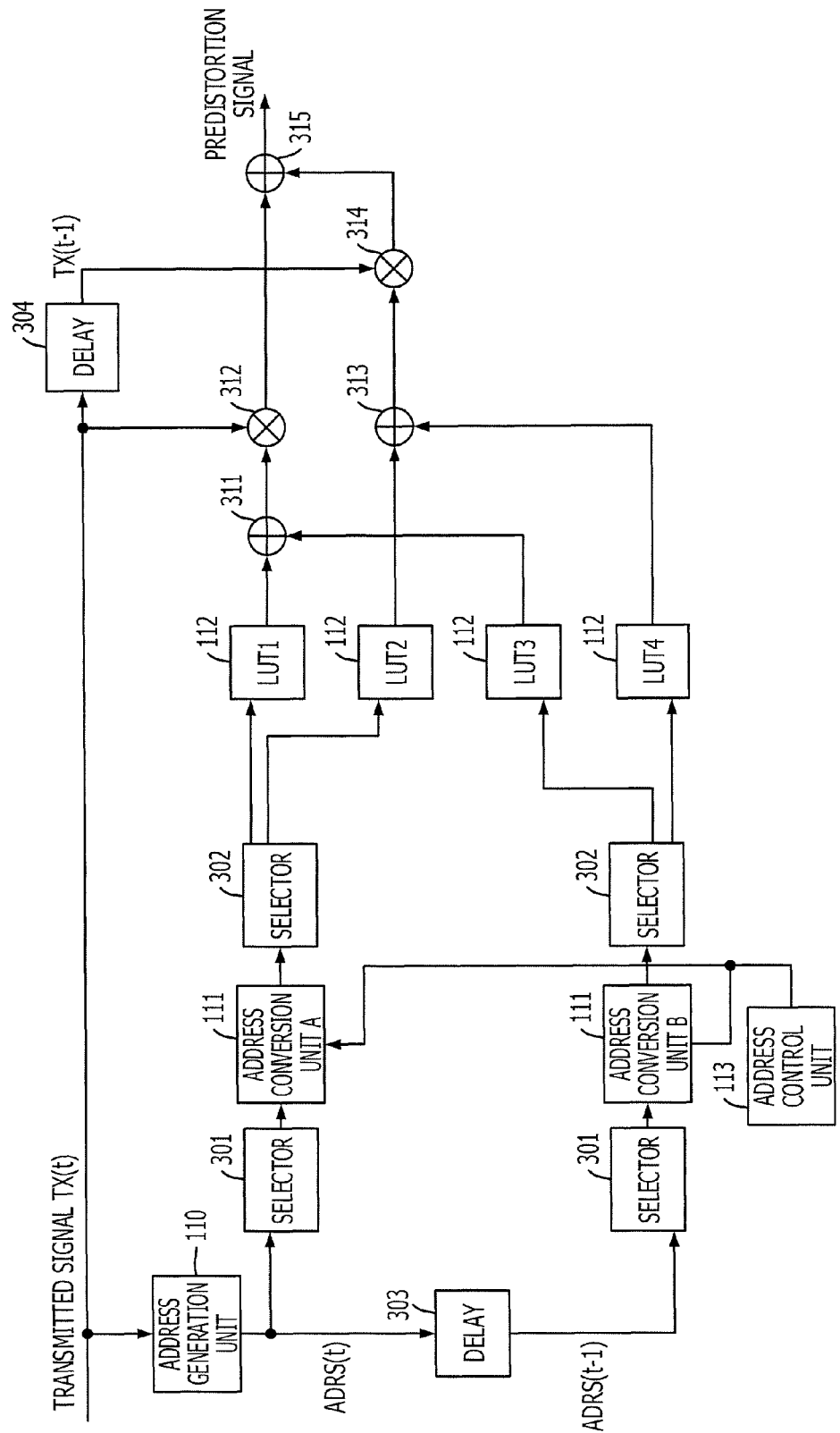

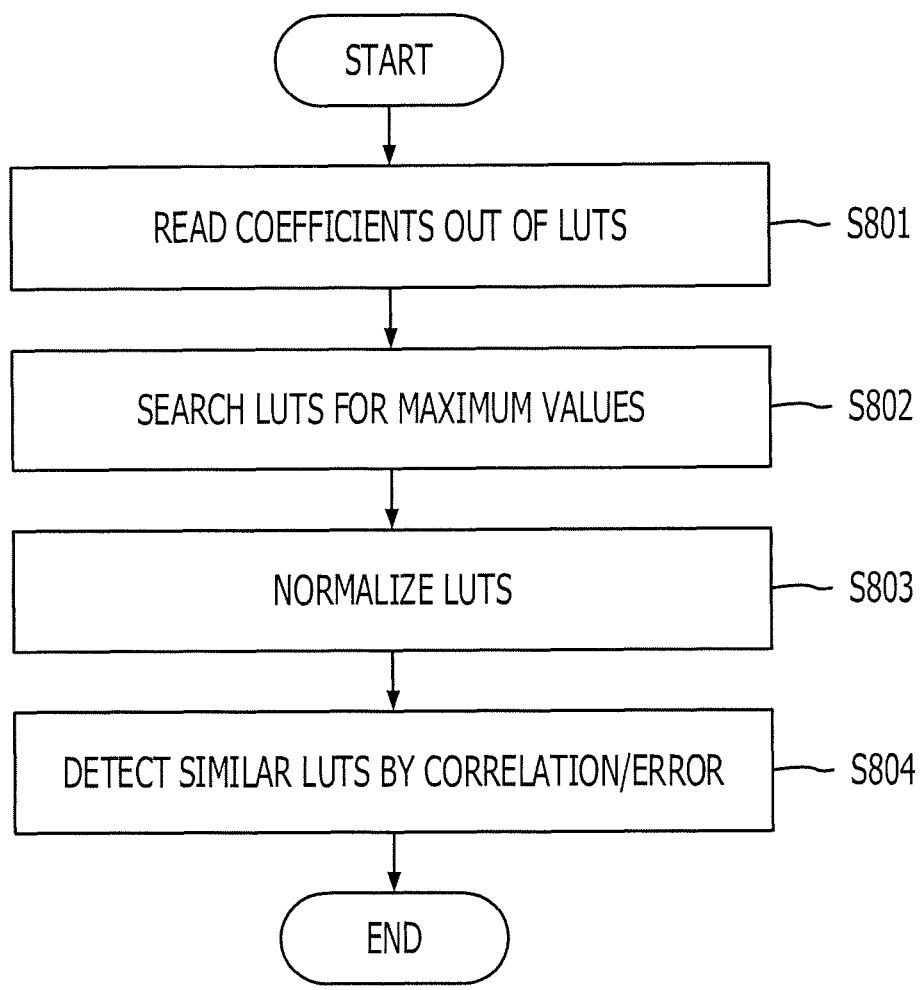

BEFORE NORMALIZATION

AFTER NORMALIZATION

BEFORE PROCESSING

AFTER PROCESSING

FIG. 13A (1) CORRELATION OPERATION WITH REFERENCE TO LUT1

| ADDRESS | 0 | 1 | 2 | 3 | |
|---|---|---|---|---|---|
| LUT1 | h10 | h11 | h12 | h13 | |
| LUT2 | h20 | h21 | h22 | h23 | R12 < th |
| LUT3 | h30 | h31 | h32 | h33 | R13 < th |
| LUT4 | h40 | h41 | h42 | h43 | R14 > th |
| LUT5 | h50 | h51 | h52 | h53 | R15 < th |

⇒ ASSIGN LUT1 AND LUT4 TO GROUP A

FIG. 13B (2) CORRELATION OPERATION WITH REFERENCE TO LUT2

| ADDRESS | 0 | 1 | 2 | 3 | |
|---|---|---|---|---|---|
| LUT2 | h20 | h21 | h22 | h23 | |
| LUT3 | h30 | h31 | h32 | h33 | R23 < th |
| LUT5 | h50 | h51 | h52 | h53 | R25 > th |

⇒ ASSIGN LUT2 AND LUT5 TO GROUP B

FIG. 13C (3) GROUPING OF LUT3 ONLY BECAUSE NO OTHER LUTS REMAIN FOR CORRELATION OPERATION

| ADDRESS | 0 | 1 | 2 | 3 |
|---|---|---|---|---|
| LUT3 | h30 | h31 | h32 | h33 |

⇒ ASSIGN LUT3 TO GROUP C

ADDRESS CONTROLLER, TRANSMITTER, AND ADDRESS CONTROL METHOD

CROSS-REFERENCE TO RELATED APPLICATION

This application is based upon and claims the benefit of priority of the prior Japanese Patent Application No. 2012-201008, filed on Sep. 12, 2012, the entire contents of which are incorporated herein by reference.

FIELD

The embodiments discussed herein are related to an address controller, a transmitter, and an address control method.

BACKGROUND

Transmitters in radio communication systems are designed such that the circuit size is reduced. Use of the power amplifier in a transmitter in the saturation region giving a high efficiency increases nonlinear distortions.

A LUT-type predistortion system that uses lookup tables (LUTs) may be adapted to suppress the nonlinear distortions and reduce adjacent channel leakage ratio (ACLR). In the LUT-type predistortion system, a previously distorted signal (predistortion signal) is input to the power amplifier to reduce the distortions of the output from the power amplifier. Distortion compensation coefficients corresponding to the amplitudes and/or powers of the transmitted signal are held in the LUTs and are multiplied by the transmitted signal to generate an optimum predistortion signal.

Related techniques are disclosed in Japanese Laid-open Patent Publication Nos. 2012-39235 and 2012-90158, the entirety of each of which is expressly incorporated by reference herein.

SUMMARY

According to one aspect of the embodiments, an address controller includes: a plurality of lookup tables configured to hold values corresponding to a plurality of addresses; a similarity detector configured to detect similarity between the plurality of lookup tables and groups similar lookup tables among the plurality of lookup tables; and a controller configured to read the values out of the plurality of lookup tables grouped by the similarity detector, using address control information common to grouped lookup tables.

The object and advantages of the invention will be realized and attained by means of the elements and combinations particularly pointed out in the claims.

It is to be understood that both the foregoing general description and the following detailed description are examples and are explanatory in nature and are not restrictive of the invention, as claimed.

BRIEF DESCRIPTION OF DRAWINGS

FIGS. 4A and 4B illustrate examples of grouping;
FIG. 8 illustrates another example of grouping process;
FIGS. 13A, 13B, and 13C illustrate an example of LUT grouping process by correlation operation.

DESCRIPTION OF EMBODIMENTS

Power amplification characteristics of a transmitter include memory effect characteristics; for example, the input and output characteristics of the transmitter at a certain time vary with the previous signal history. A signal with a wide bandwidth and a high frequency may significantly be affected by the memory effect. Distortion compensation methods that address the memory effect include a distortion compensation method using a Volterra series.

In a distortion compensation method that uses the Volterra series or the like, LUT coefficients are created from Volterra series coefficients and a plurality of delay devices and a plurality of LUTs are accordingly used for address control of individual LUTs. When a plurality of LUTs is used, different coefficients are stored in different LUTs. Batch control of LUT addresses by optimization, therefore, may not achieve sufficient distortion compensation. Optimization processes performed for individual LUTs may increase the processing amount and the circuit size.

Figure 1:
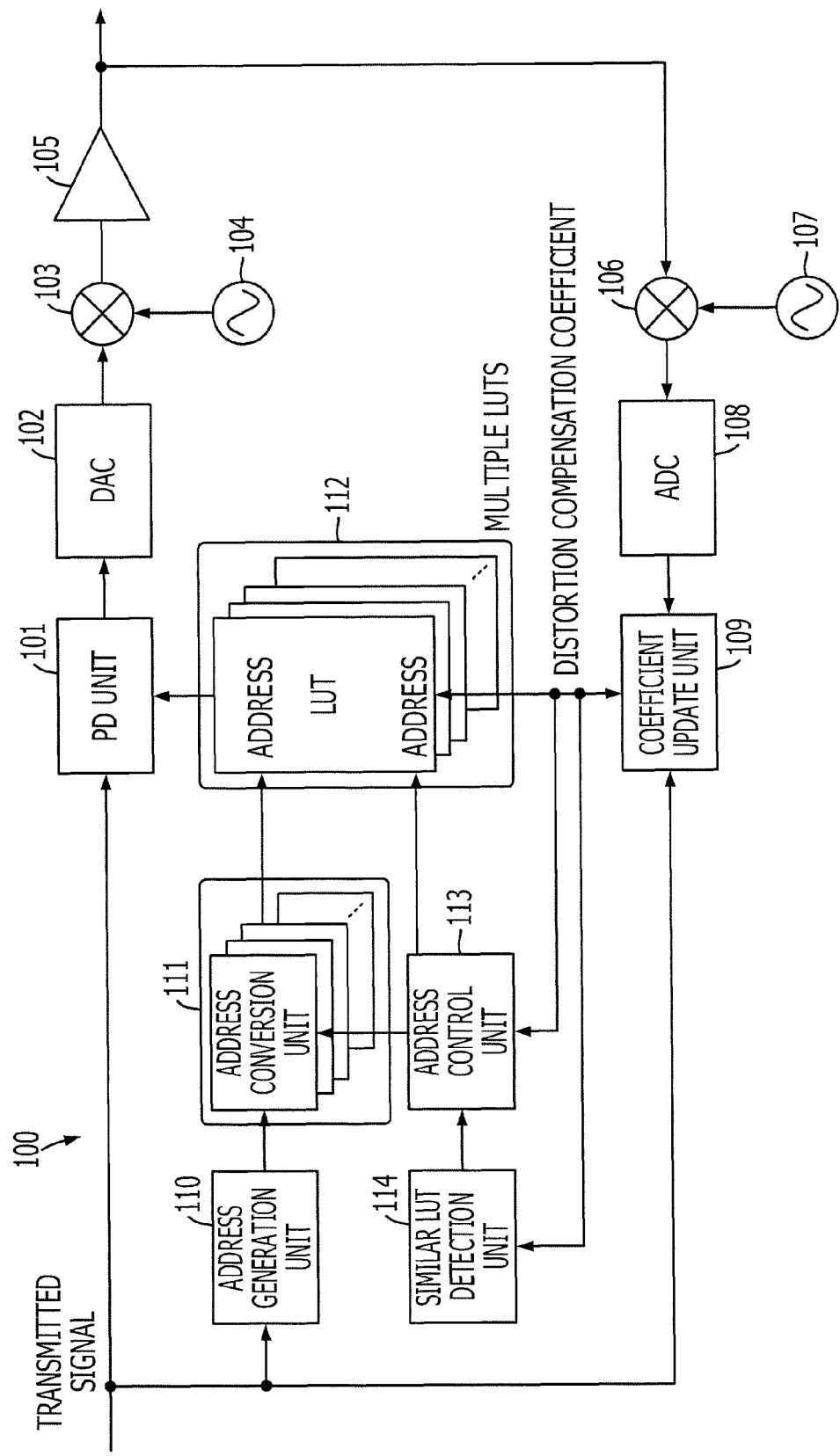
FIG. 1 illustrates an example of transmitter.

FIG. 1 illustrates an example of transmitter. A transmitter 100 includes a distortion compensation circuit that compensates for distortions of a transmitted signal.

The transmitter 100 includes a predistortion (PD) unit 101, digital-to-analog converter (DAC) 102, multipliers 103, 106, oscillators 104, 107, power amplifier 105, analog-to-digital converter (ADC) 108, coefficient update unit 109, address generation unit 110, address conversion unit 111, a plurality of lookup tables (LUT) 112, address control unit 113, and similar LUT detection unit 114.

A transmitted signal input to the transmitter 100 is input to the PD unit 101 and a predistortion signal is generated using coefficients (distortion compensation coefficients) read out of the LUTs 112. The predistortion signal thus generated is converted from digital to analog by the DAC 102. The analog signal is frequency-converted to an RF band by a frequency converter. The frequency converter may include multiplier 103 and oscillator 104. After frequency conversion, the transmitted signal is amplified and output by radio by the power amplifier 105.

Part of the output signal from the power amplifier 105 is fed back, frequency-converted by the frequency converter, and converted to digital by the ADC 108. The frequency converter may include multiplier 106 and oscillator 107. The fed-back signal and the transmitted signal are supplied to the coefficient update unit 109 to update the coefficients (distortion compensation coefficients) and the updated coefficients are stored in the LUTs 112.

The address control unit 113 calculates a coefficient gradient relative to the address based on the coefficients read out of the LUTs 112 to generate address control information. The generated address control information is input to the address conversion unit 111 that performs an address conversion process for the LUTs 112.

The address conversion unit 111 may include a volatile or nonvolatile memory circuit. The address conversion unit 111 stores an address conversion table that indicates the correspondence between the sub-addresses generated by the address generation unit 110 and the addresses in the LUTs 112. When receiving a sub-address from the address generation unit 110, the address conversion unit 111 references the address conversion table to identify the address corresponding to the received sub-address.

The address conversion unit 111 outputs the identified address to the LUTs 112. The address conversion unit 111 outputs the current address conversion table stored therein to the address control unit 113. The coefficient update unit 109, therefore, references, via the address control unit 113, each address in the LUTs 112 identified by the address conversion table.

Figure 2:
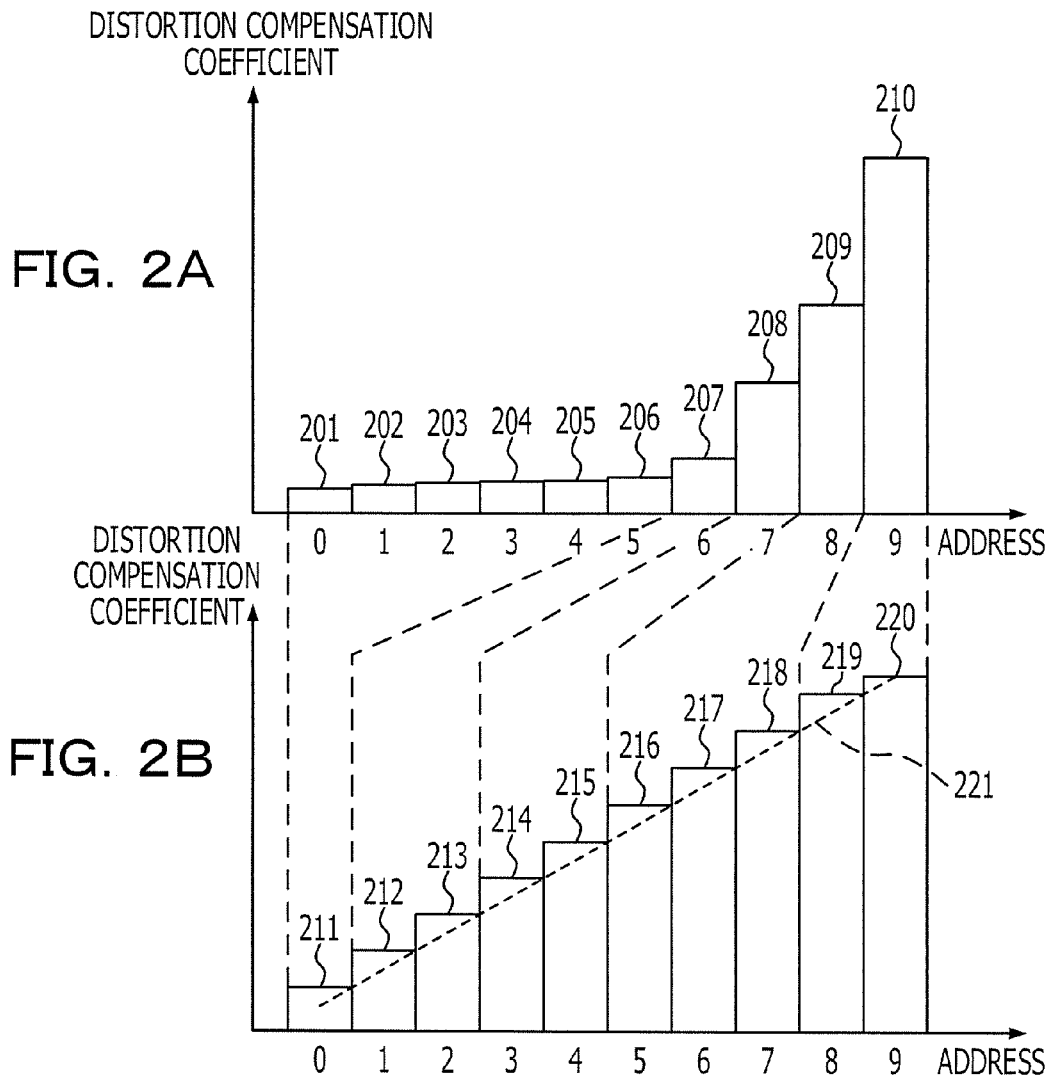
FIGS. 2A and 2B illustrate an example of address optimization.

FIGS. 2A and 2B illustrate an example of address optimization. The horizontal axis indicates addresses, while the vertical axis indicates distortion compensation coefficients. FIG. 2A illustrates the relationship between unoptimized addresses in LUTs 112 and corresponding distortion compensation coefficients. FIG. 2B illustrates the relationship between optimized addresses in LUTs 112 and corresponding distortion compensation coefficients. Bars 201 to 220 in FIGS. 2A and 2B represent the distortion compensation coefficients stored at corresponding addresses. The distortion compensation coefficients may have values in the range of 1.0 to 1.5, for example. The correspondence between the addresses in FIGS. 2A and 2B, for example, may be stored in the address conversion table.

The input and output characteristics of power amplifier 105 are distorted in a non-linear fashion. If a single address is assigned to each of a plurality of blocks that corresponds to equally divided parts of a range of values that the power of the transmitted signal may assume, the relationship between the address increments and the distortion compensation coefficient increments becomes non-linear, as illustrated in FIG. 2A.

Although the distortion compensation coefficients (values) at addresses 0 to 5 are substantially uniform as represented by bars 201 to 206, the distortion compensation coefficients (values) at addresses 6 to 9 abruptly increase as represented by bars 207 to 210. The differences in distortion compensation coefficients between adjacent addresses are relatively large at addresses 6 to 9. When the power values of the transmitted signal are equal to or higher than the power value corresponding to address 6, a predistortion process for the transmitted signal may be performed using the distortion compensation coefficient corresponding to any one of the addresses. In this case, nonlinear distortions of the input and output characteristics of the power amplifier 105 may not be compensated for in an appropriate manner.

For example, as illustrated in FIG. 2B, the address control unit 113 stores, at a single address 0, distortion compensation coefficients for the powers corresponding to unoptimized addresses 0 to 5. The address control unit 113 increases addresses and distortion compensation coefficients to be assigned to the range of powers of the transmitted signal corresponding to the unoptimized addresses 6 to 9. Because an increased number of addresses are assigned to a range in which the values widely vary, the limited address range of the LUTs 112 may be used in an effective manner.

After address optimization, the distortion compensation coefficient increments become linear with respect to the address increments. The address control unit 113 modifies the distortion compensation coefficients, such that the distortion compensation coefficients increase along a straight line 221. Accordingly, regardless of the powers of the transmitted signal, the differences between the distortion compensation coefficients at adjacent addresses become uniform and the absolute values of the differences decrease as a whole. For a transmitted signal having any power, the nonlinear distortions of the input and output characteristics of the power amplifier 105 may be appropriately compensated for by performing a predistortion process using the distortion compensation coefficient at a single address.

The transmitter 100 in FIG. 1 may include a similar LUT detection unit 114. The similar LUT detection unit 114 groups together a plurality of similar LUTs 112 based on the coefficients read out of the plurality of LUTs 112. Group information is output to the address control unit 113. The address control unit 113 generates address control information of LUTs 112 of each group. The address conversion process described above is performed on the plurality of LUTs 112 belonging to the same group.

A common address control process may be performed on the plurality of LUTs 112. For example, it is possible accordingly to provide a reduced number of address conversion units 111, instead of providing the same number of address conversion units 111 as the number of LUTs 112, and to allow a single address conversion unit 111 to perform address conversion for the grouped LUTs 112. Values corresponding to the addresses are read out of each LUT 112.

Figure 3:
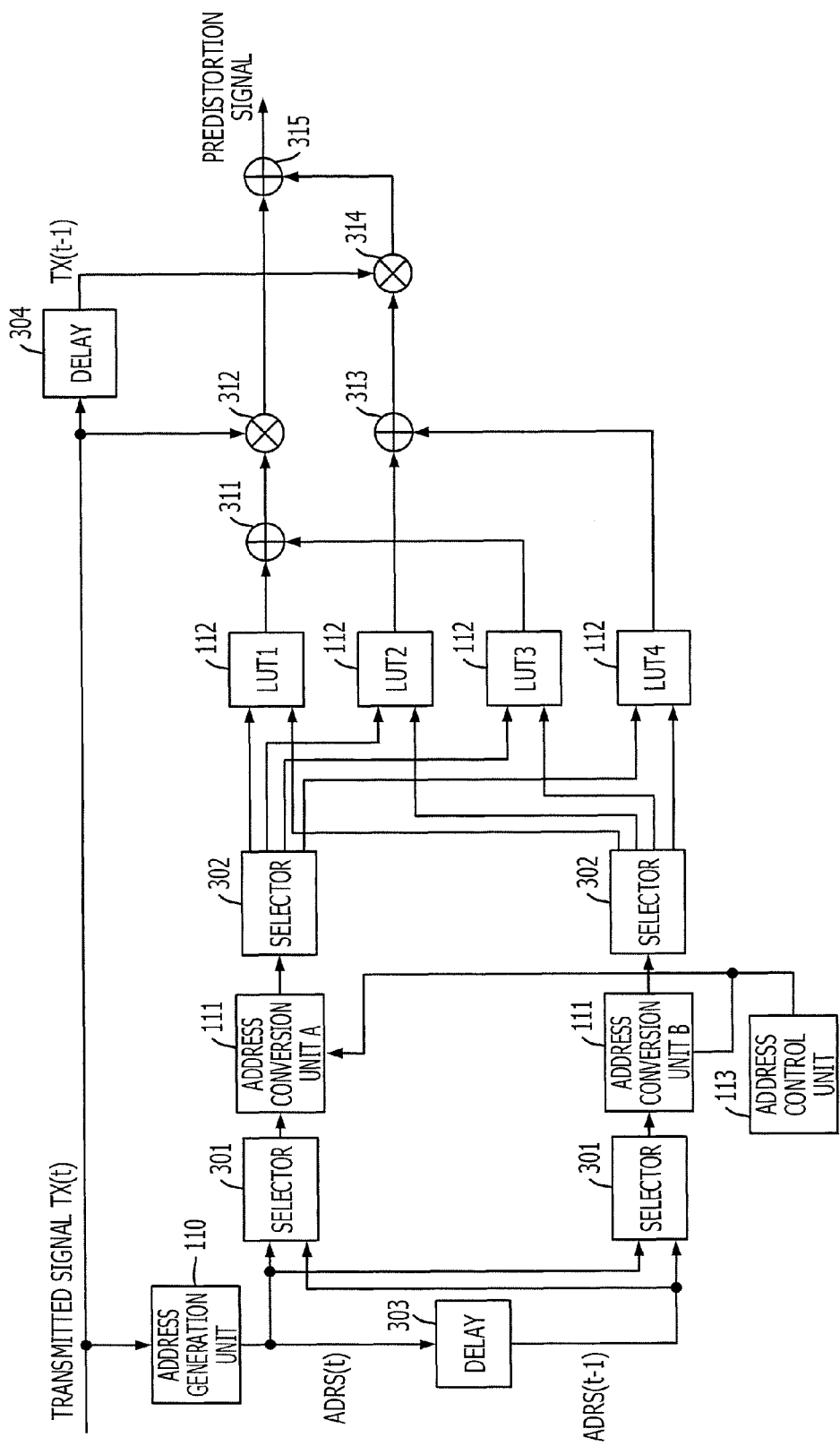
FIG. 3 illustrates an example of circuit including a plurality of LUTs.

FIG. 3 illustrates an exemplary circuit with a plurality of LUTs. In FIG. 3, four LUTs may be divided into two groups, for example. As illustrated in FIG. 3, distortion compensation is performed using a Volterra series or the like to suppress the memory effect. A delay device (Delay) 303 is provided on the address (Adrs) line, while another delay device (Delay) 304 is provided on the line for the transmitted signal (TX). Because the LUTs 112 are disposed at the stage between the delay devices 303 and 304, the memory effect that alters the input and output characteristics at a certain time according to the previous signal history may be suppressed. Although single-stage delay devices are illustrated in FIG. 3, delay devices may be provided at multiple stages. The distortion compensation accuracy may be enhanced by increasing the number of LUTs 112 in correspondence with the multi-stage delay devices.

The address conversion units 111 may include address conversion units A and B associated with the two groups of LUTs. Selectors 301 and 302 may be coupled to the input and output sides of the address conversion units 111 to switch the addresses to be used. The addresses (Adrs(t)) generated by the address generation unit 110 and the addresses (Adrs(t−1)) delayed by the delay device (Delay) 303 are input to the selectors 301 on the input side. The selectors 302 on the output side select the LUTs 112 that use the converted addresses output by the address conversion units 111.

The outputs (distortion compensation coefficients) from the LUT1 and LUT3 (112) are summed by an adder 311 and then multiplied by the transmitted signal TX(t) at the multiplier 312. The outputs (distortion compensation coefficients) from the LUT2 and LUT4 (112) are summed by an adder 313 and then multiplied by the delayed transmitted signal TX(t−1) at the multiplier 314. The outputs from the multipliers 312, 314 are summed by an adder 315 and output as the predistortion signal.

Figure 4B:
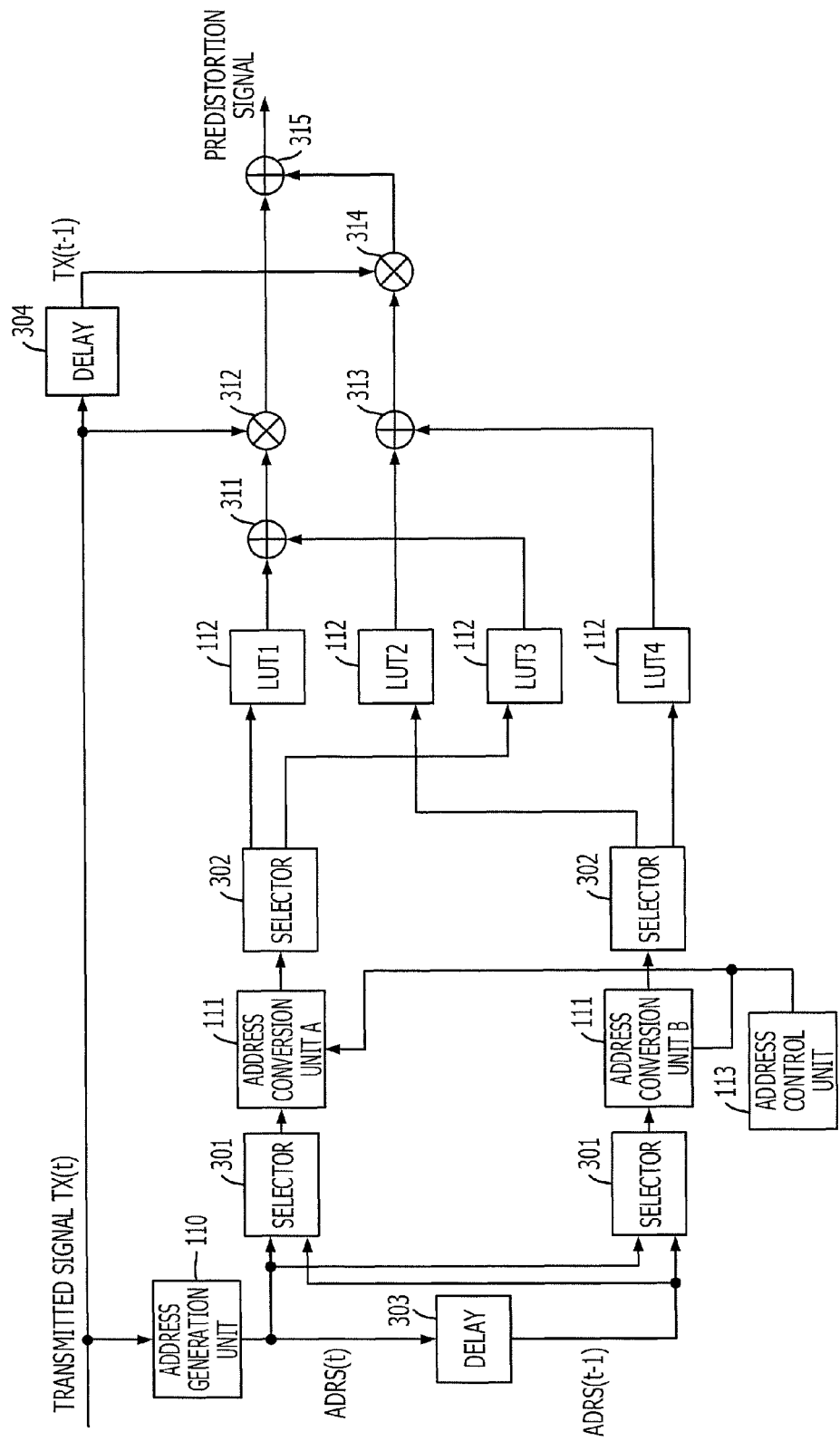

FIGS. 4A and 4B illustrate examples of grouping of LUTs. The examples of grouping illustrated in FIGS. 4A and 4B may correspond to the grouping illustrated in FIG. 3. The wires coupled to the selectors 301 and 302 represent grouped wires for convenience. In FIG. 4A, four LUTs (LUT1, LUT2, LUT3 and LUT4) 112 are divided into two groups: group A including LUT1 and LUT 2 and group B including LUT3 and LUT4.

An undelayed address (Adrs(t)) may be input to the address conversion unit A (111) and the converted address may be input to the LUT1 and LUT2 (112). An address (Adrs(t−1)) delayed by the delay device (Delay) 303 may be input to the address conversion unit B (111) and the converted address may be input to the LUT3 and LUT4 (112).

In FIG. 4B, four LUTs (LUT1, LUT2, LUT3 and LUT4) are divided into two groups: group A including LUT1 and LUT3 and group B including LUT2 and LUT4.

In FIG. 4B, because LUT1 and LUT3 (112) belong to group A, the address input to LUT1 (112) is the address converted from Adrs(t) by the address conversion unit A (111). The address input to LUT3 (112) is the address converted from Adrs(t−1) by the address conversion unit A (111).

Because LUT2 and LUT4 (112) belong to group B, the address input to LUT2 (112) is the address converted from Adrs(t) by the address conversion unit B (111). The address input to LUT4 (112) is the address converted from Adrs(t−1) by the address conversion unit B (111).

Figure 5:
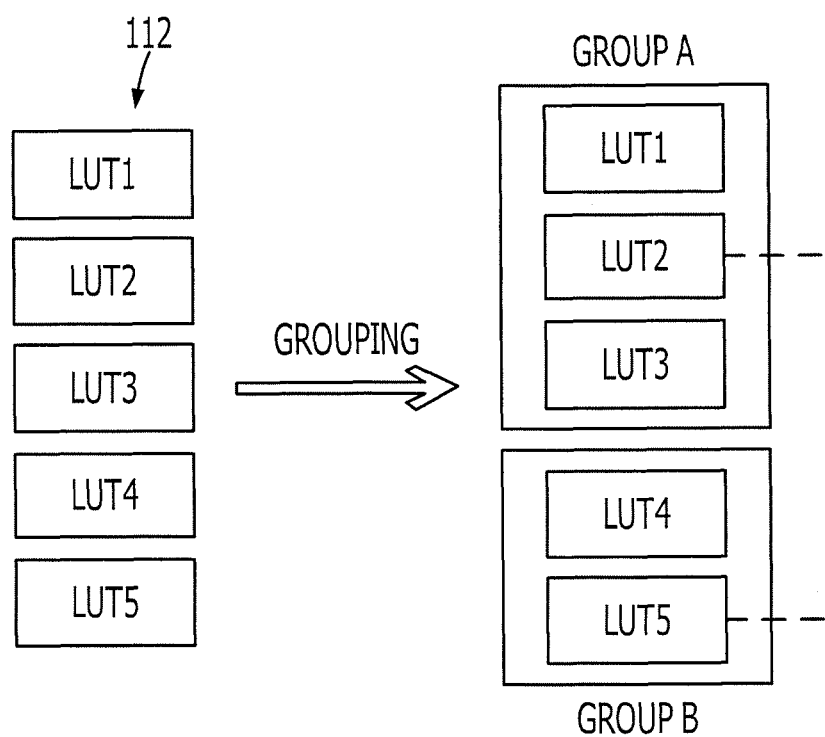
FIG. 5 illustrates an example of address control.

FIG. 5 illustrates an example of address control. An address control process is performed on the grouped LUTs using any one of the LUTs in the group. For example, in FIG. 5, five LUTs (LUT1, LUT2, LUT3, LUT4 and LUT5) are divided into two groups (groups A and B). When LUT1, LUT2, LUT3, LUT4 and LUT5 are divided into two groups, LUT1, LUT2, and LUT3 may belong to group A and LUT4 and LUT5 may belong to group B.

The address control unit 113 selects one LUT from each of groups A and B and performs address control using the coefficients stored in the selected LUT. For example, in FIG. 5, the address control process in group A uses LUT 2, while the address control process in group B uses LUT 5.

Alternatively, the address control process in group A may use LUT1 or LUT3, while the address control process in group B may use LUT4. Because the plurality of LUTs that belong to the same group have substantially the same or similar characteristics curves (i.e., states of coefficients varying with respect to addresses), any one of the LUTs in the group may be used for the address control process.

Figure 6:
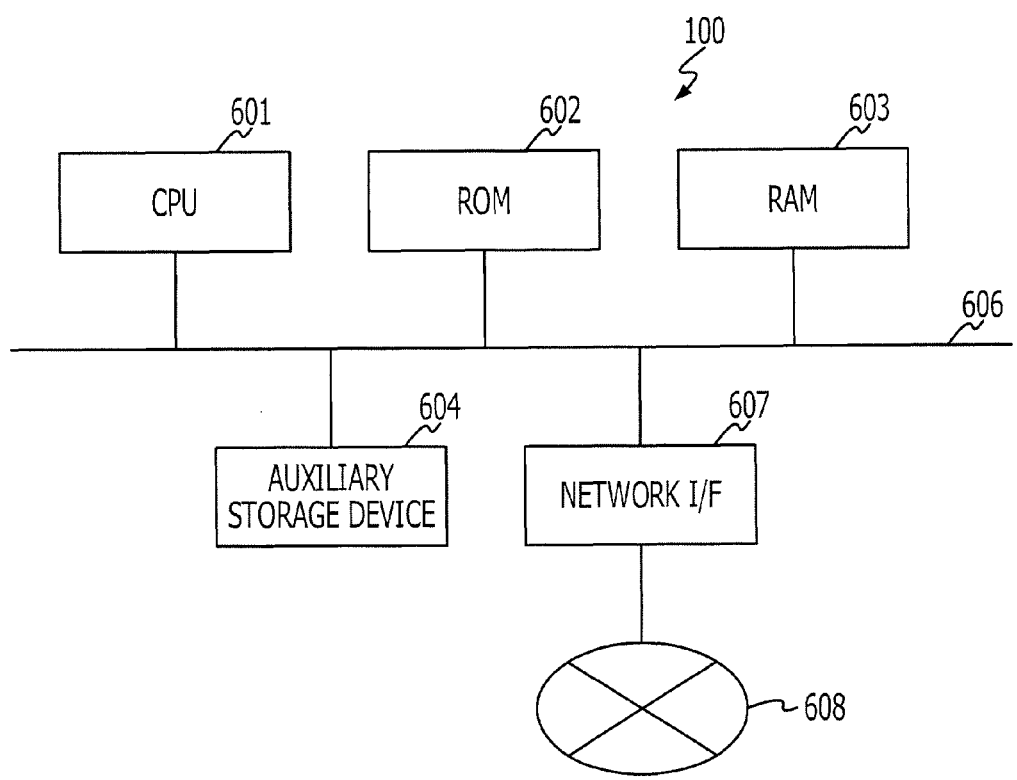
FIG. 6 illustrates an example of hardware configuration in a communication apparatus.

FIG. 6 illustrates an example of hardware configuration of a communication apparatus. The transmitter 100 includes a central processing unit (CPU) 601, read-only memory (ROM) 602, random access memory (RAM) 603, and a HDD or other auxiliary storage device 604. These units are coupled to each other by a bus 606.

The CPU 601 controls the transmitter 100 as a whole. The ROM 602 stores a boot program and other programs. The RAM 603 may be used by the CPU 601 as its work area.

A network interface (I/F) 607 may be coupled to a mobile telephone network or other communication network 608 for the transmitter 100. The transmitter 100 may be either a base station or a mobile station in the mobile telephone network. If it is a mobile station, for example, an input and output interface (I/F) may be provided and a keyboard or other input device, and a display or other output device, may be coupled thereto.

Among the functions of the transmitter 100 illustrated in FIG. 1, the functions other than the frequency converters, which include the multipliers 103, 106 and the oscillators 104, 107, and the power amplifier 105 may be performed by executing a predetermined program in the CPU 601 illustrated in FIG. 6, or may be performed by a particular hardware circuit. The RAM 603 or auxiliary storage device 604 illustrated in FIG. 6 may be used as the LUTs 112 illustrated in FIG. 1.

Figure 7:
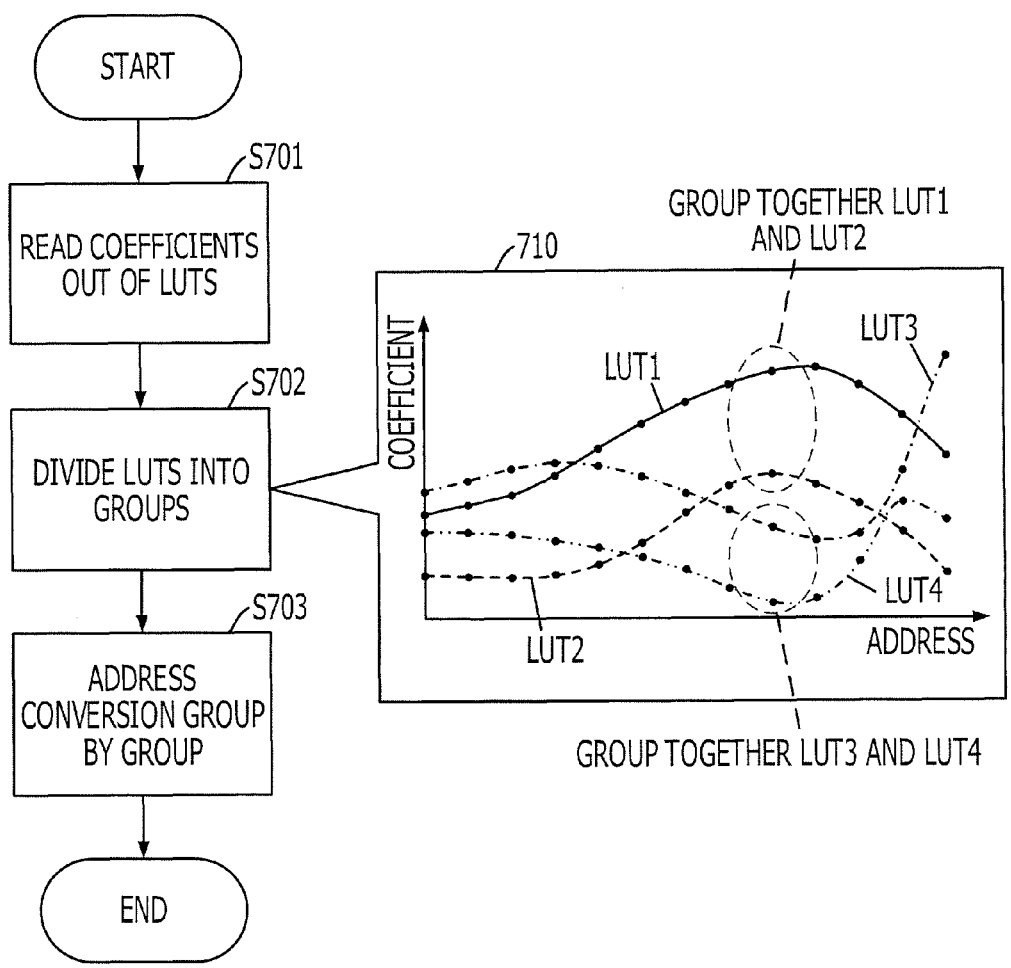
FIG. 7 illustrates an example of grouping process.

FIG. 7 illustrates an example of the LUT grouping process. The LUT grouping process in FIG. 7 may be performed by the units illustrated in FIG. 1. The similar LUT detection unit 114 reads coefficients (distortion compensation coefficients) out of the plurality of LUTs 112 (operation S701). The similar LUT detection unit 114 groups together a plurality of LUTs 112 holding similar coefficients (operation S702).

For example, the graph 710 in FIG. 7 illustrates the contents of four LUTs, such as the states of the coefficients (characteristics curves LUT1, LUT2, LUT3 and LUT4) varying with the address, for example. LUT1 and LUT2, in which the coefficient characteristics vary similarly as the address advances, may belong to the same group. Likewise, LUT3 and LUT4, in which the coefficient characteristics vary similarly as the address advances, may belong to the same group. The similar LUT detection unit 114 may divide a plurality of LUTs into a certain number of groups (for example, two groups in FIG. 7) by identifying similar variations in characteristics.

The address control unit 113 performs an address conversion process group by group (operation S703) and outputs the converted address information to the address conversion unit 111.

Because the LUTs are grouped as described above, one address conversion process is performed for LUT1 and LUT2 and another address conversion process is performed for LUT3 and LUT4. Because two address conversion processes are performed for the four LUTs, the number of processes performed by the address conversion unit 111 is reduced from four to two. Because two address conversion units 111 are used for the address conversion for the four LUTs (LUT1 to LUT4) (112), the address control processes for the plurality of LUTs may be more easily performed.

FIG. 8 illustrates an example of The LUT grouping process. In FIG. 8, the grouping process is performed by normalizing the maximum coefficients in the LUTs. The similar LUT detection unit 114 reads coefficients (distortion compensation coefficients) out of the plurality of LUTs 112 (operation S801). The similar LUT detection unit 114 searches the plurality of LUTs for the maximum coefficient values (operation S802). The similar LUT detection unit 114 normalizes the detected maximum coefficient values such that the maximum coefficient values become identical (operation S803).

The similar LUT detection unit 114 detects similar LUTs through correlation operation or error operation using the normalized coefficients and groups together similar LUTs (operation S804). Then, the address control unit 113 performs an address conversion process group by group (operation S703 in FIG. 7) and outputs the converted address information to the address conversion unit 111.

Figure 9A:
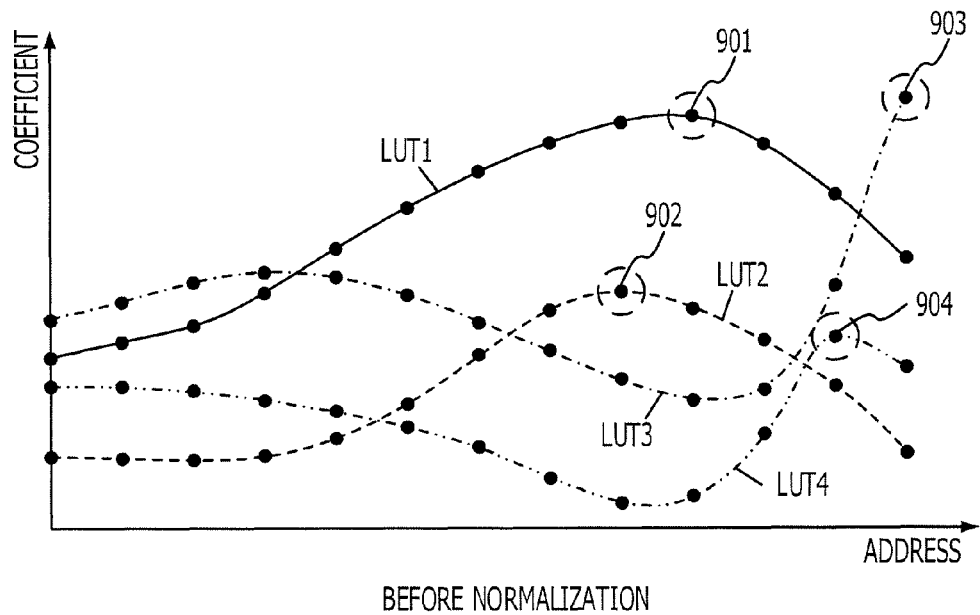
FIGS. 9A and 9B illustrate examples of LUT contents.
Figure 9B:
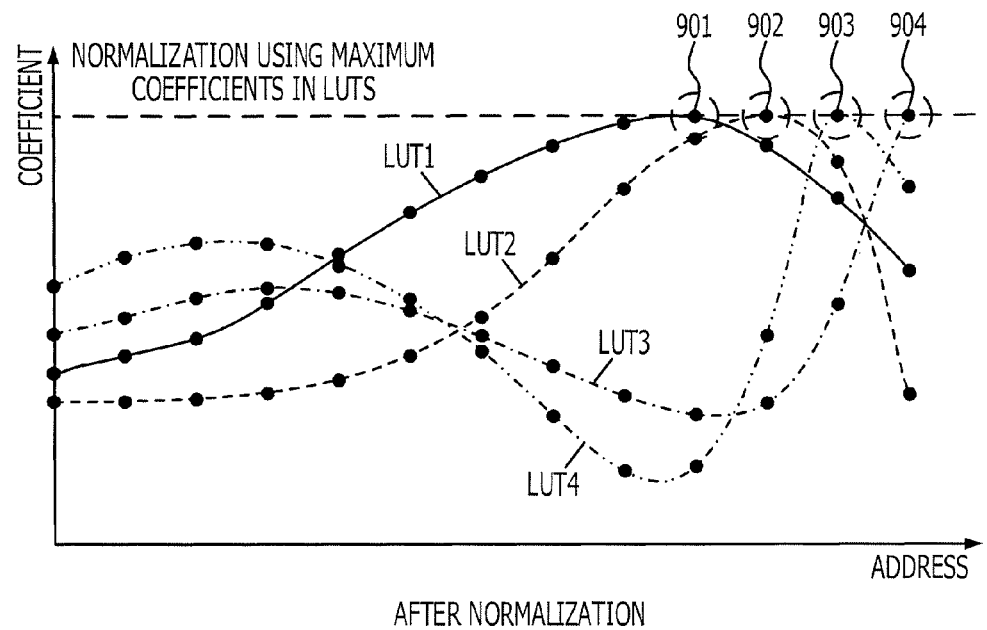

FIGS. 9A and 9B illustrate an example of LUT contents. FIGS. 9A and 9B represent unnormalized and normalized LUT contents, respectively. FIG. 9A illustrates characteristics curves LUT1, LUT2, LUT3 and LUT4 that represent unnormalized contents of four LUTs, such as the states of coefficients varying with the address, for example. Operation S802 in FIG. 8 searches the four LUTs for the maximum coefficient values. More specifically, it searches LUT1 for the maximum coefficient value 901, LUT2 for the maximum coefficient value 902, LUT3 for the maximum coefficient value 903, and LUT4 for the maximum coefficient value 904.

As illustrated in FIG. 9B, the normalization process by operation S803 in FIG. 8 normalizes the characteristics of the LUT1, LUT2, LUT3 and LUT4, such that the maximum coefficient values 901, 902, 903 and 904 in LUT1, LUT2, LUT3 and LUT4 become identical. For example, the maximum coefficient value 902 in LUT2 is scaled by a scaling factor, such that the maximum coefficient value 902 in LUT2 becomes the same value as the maximum coefficient value 901 in LUT1, without altering the coefficients in LUT1 as a whole. The LUT characteristics curve (varying state) of LUT2 may be maintained by scaling the coefficients at the other addresses in LUT2 by a similar scaling factor. The coefficients in LUT3 and LUT4 may also be scaled as in LUT2.

Because the maximum coefficient values become identical through the normalization process as illustrated in FIG. 9B, variations in characteristics curves of LUT1, LUT2, LUT3 and LUT4 may easily be determined and the correlation operation or error operation may accurately be performed. For example, even for a LUT having small coefficient (amplitude, for example) values over the entire address range, variations in characteristics for the LUT may accurately be determined and the correlation operation or error operation may be correctly performed.

LUT1 and LUT2, in which the coefficient characteristics vary substantially similarly as the address advances, may belong to the same group. Likewise, LUT3 and LUT4, in which the coefficient characteristics vary substantially similarly as the address advances, may belong to the same group. The similar LUT detection unit 114 may divide a plurality of LUTs into a number of groups (two groups in FIGS. 9A and 9B, for example) by identifying substantially similar variations in characteristics.

Figure 10:
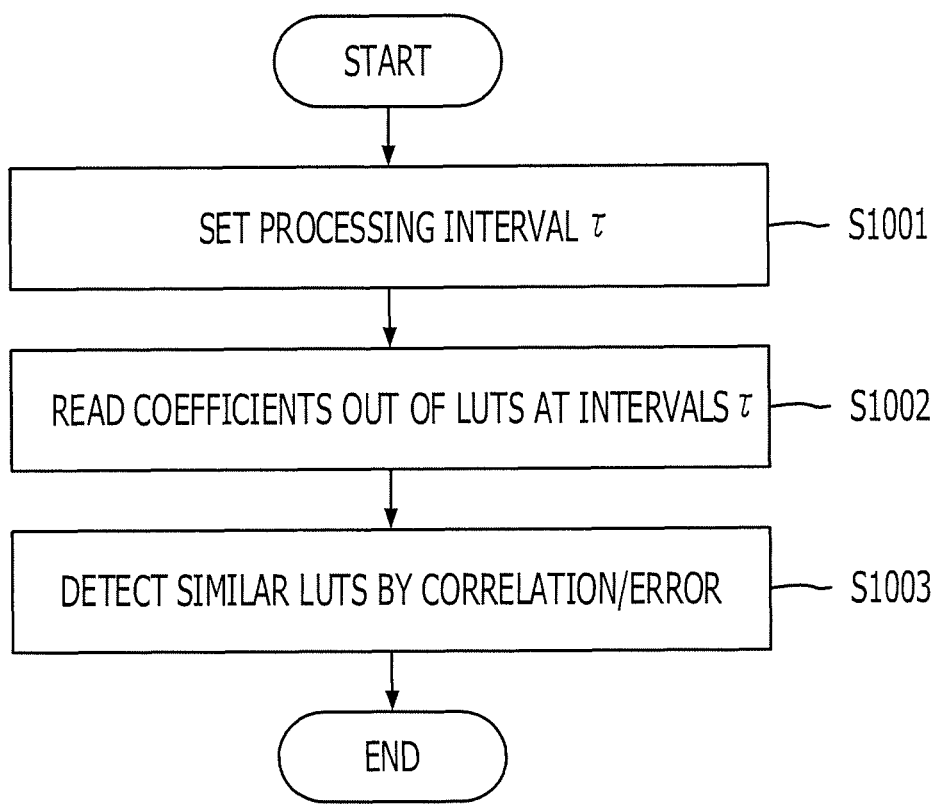
FIG. 10 illustrates an example of grouping process.

FIG. 10 illustrates an example of the LUT grouping process. In FIG. 10, LUT grouping is performed through a decimation process. The similar LUT detection unit 114 sets a processing interval τ as the initial value (operation S1001). The processing interval τ may be set such that, when a plurality of addresses is sequentially searched for coefficient values, not all the addresses are searched but addresses are searched at intervals of a certain number of addresses.

The similar LUT detection unit 114 reads coefficients (distortion compensation coefficients) out of the plurality of LUTs 112 at processing intervals τ (operation S1002). The similar LUT detection unit 114 uses these coefficients to detect similar LUTs through the correlation operation or error operation and group together similar LUTs (operation S1003). Then, the address control unit 113 performs an address conversion process group by group (operation S703 in FIG. 7) and outputs the converted address information to the address conversion unit 111.

Figure 11A:
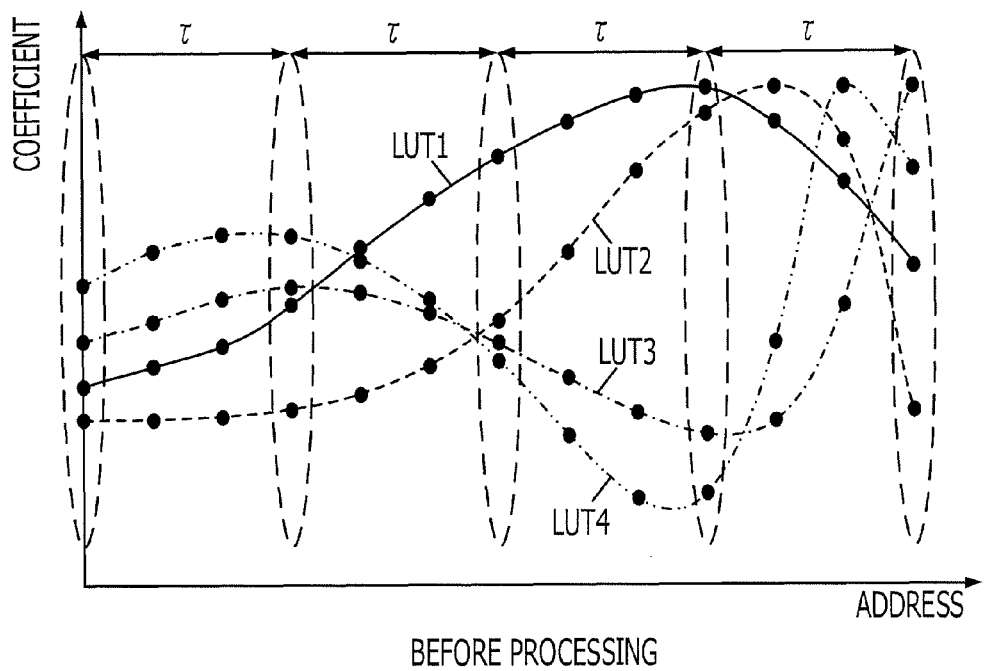
FIGS. 11A and 11B illustrate examples of LUT contents before and after a decimation process.
Figure 11B:
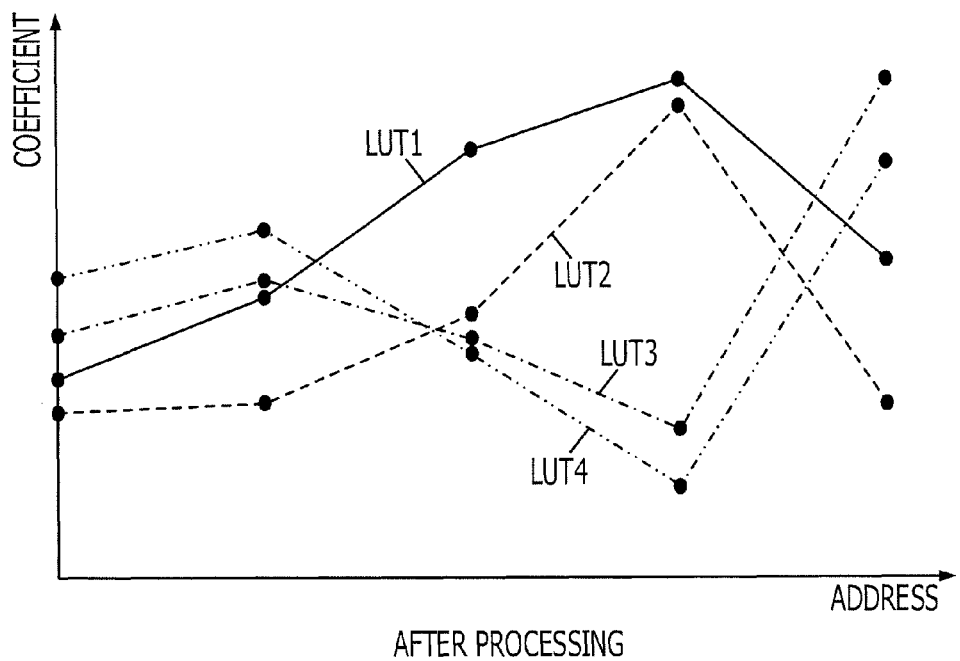

FIGS. 11A and 11B illustrate examples of LUT contents before and after a decimation process. FIG. 11A illustrates characteristics curves LUT1 to LUT4 that represent contents of four LUTs before being decimated, such as the states of coefficients varying with the address, for example. FIG. 11A, in which the coefficient processing intervals τ are set for the four LUTs by operation S1001 in FIG. 10, represents the states after the LUT normalization process in FIG. 9B. The decimation process may be performed in this way after the normalization process. The coefficients at the addresses corresponding to the processing intervals τ may be processed.

FIG. 11B illustrates characteristics curves LUT1, LUT2, LUT3 and LUT4 of the four LUTs (LUT1, LUT2, LUT3 and LUT4) after being decimated. The decimation process allows the coefficient values at the addresses corresponding to the processing intervals to remain in the LUTs (LUT1, LUT2, LUT3 and LUT4), deleting the coefficient values at the other addresses. In FIG. 11A, each LUT holds thirteen coefficients.

In FIG. 11B, LUT1, LUT2, LUT3 and LUT4 each hold five coefficients because two addresses (coefficients) are decimated.

Because the characteristics curves LUT1, LUT2, LUT3 and LUT4 are simplified correspondingly as the data to be processed are decimated, variations in the characteristics curves may easily be determined. The processing amount of correlation operation or error operation is reduced, so the grouping process, such as operation S1003 for example, may be simplified. LUT1 and LUT2, in which the coefficient characteristics vary substantially similarly as the address advances, may belong to the same group. Likewise, LUT3 and LUT4, in which the coefficient characteristics vary substantially similarly as the address advances, may belong to the same group.

Figure 12:
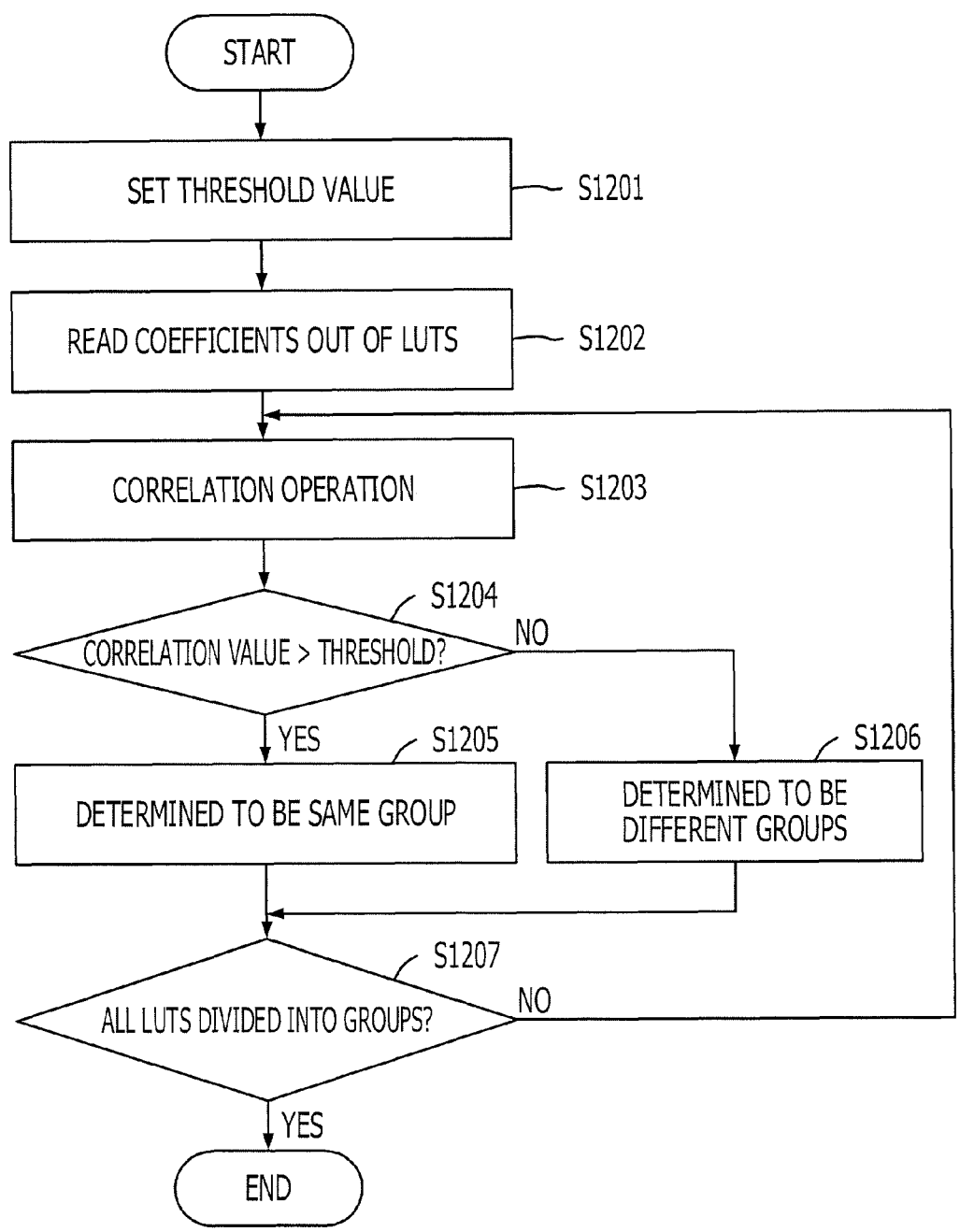
FIG. 12 illustrates an example of LUT grouping process by correlation operation.

FIG. 12 illustrates an example of a LUT grouping process by correlation operation. The grouping process in FIG. 12 may correspond to the correlation operation performed by the similar LUT detection unit 114, such as operation S804 in FIG. 8 or operation S1003 in FIG. 10, for example. A predetermined threshold value is set in the similar LUT detection unit 114 (operation S1201). The similar LUT detection unit 114 reads coefficients (distortion compensation coefficients) out of the LUTs (operation S1202) and performs correlation operation between the LUTs (operation S1203).

The similar LUT detection unit 114 compares the correlation value between the LUTs to the threshold value (operation S1204). If the correlation value exceeds the threshold value (operation S1204: Yes), the similar LUT detection unit 114 determines that the LUTs belong to the same group (operation S1205); if the correlation value is equal to or lower than the threshold value (operation S1204: No), the similar LUT detection unit 114 determines that the LUTs belong to different groups (operation S1206).

After performing operations S1205 and S1206, the similar LUT detection unit 114 determines whether all the LUTs have been grouped (operation S1207). If not all the LUTs have been grouped (operation S1207: No), the process returns to operation S1203; if all the LUTs have been grouped (operation S1207: Yes), the grouping process ends.

FIGS. 13A, 13B, and 13C illustrate example LUT grouping processes using correlation operations. In FIGS. 13A to 13C, five LUTs (LUT1, LUT2, LUT3, LUT4 and LUT5) are divided into groups. Each LUT has four addresses (addresses 0 to 3) and a coefficient (distortion compensation coefficient) h may be stored at each of these addresses.

As illustrated in FIG. 13A, the similar LUT detection unit 114 uses a certain LUT (LUT1, for example) as the reference LUT and performs correlation operation between the reference LUT1 and the other LUTs (LUT2, LUT3, LUT4 and LUT5) (operation S1203 in FIG. 12). This correlation operation is performed using the correlation coefficient R in the following formula (1).

Correlation Coefficient $$R = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

The correlation coefficient between LUT1 and LUT2 may be R12, the correlation coefficient between LUT1 and LUT3 may be R13, the correlation coefficient between LUT1 and LUT4 may be R14, and the correlation coefficient between LUT1 and LUT5 may be R15. It may be determined whether the correlation coefficients R12, R13, R14 and R15 exceed the preset threshold value th (operation S1204 in FIG. 12). In FIG. 13A, because only R14 exceeds th, the similar LUT detection unit 114 assigns LUT1 and LUT4 to group A (operation S1205 in FIG. 12).

In FIG. 13B, the similar LUT detection unit 114 performs a similar correlation operation on LUT2, LUT3, and LUT5, for example, LUT1 and LUT4 having been grouped in the above process. In this correlation operation, the reference LUT may be LUT2. Because only R25 exceeds th, LUT2 and LUT5 are assigned to group B as illustrated in FIG. 13B.

As illustrated in FIG. 13C, the similar LUT detection unit 114 assigns the remaining LUT3, for example, LUT1, LUT2, LUT4, and LUT5 having been grouped in the above processes, to group C.

If a cumulative error is used instead, substantially the same process as the above correlation operation may be performed. In this case, the cumulative error is calculated in the correlation operation process (such as operation S1203 in FIG. 12). The similar LUT detection unit 114 calculates a cumulative error (error) using the following formula (2) and compares the calculated cumulative error to the threshold value th to decide grouping (equivalent to operations S1204 to S1206 in FIG. 12).

$$\text{error} = \sum_{i=0}^{n} (h_{an} - h_{bn}) \quad (2)$$

where a and b are LUT numbers and n is an address.

Based on the similarity of the data (coefficients) stored in a plurality of LUTs, similar LUTs are grouped together and addresses are used in common in each group. This may allow the address control for a plurality of LUTs to be achieved easily group by group.

The above embodiment may be applied to transmitters used for the LUT-type predistortion method using a plurality of LUTs for distortion compensation to reduce the memory effect. The similarity between the characteristics curves including distortion compensation coefficients stored at different addresses in a plurality of LUTs is determined and the LUTs are divided into groups. Because LUTs having similar characteristics curves belong to the same group, address control is performed group by group and thereby the distortions of the outputs of the power amplifier are reduced. This may improve the distortion compensation performance and simplify control. Because address control on a plurality of LUTs is performed group by group, the processing amount and circuit size for the address control may be reduced.

The above embodiment may be applied not only to transmitters, but also to various apparatus having a plurality of LUTs installed therein. The LUTs are divided into groups based on the similarity between the data stored in the LUTs and address control is performed on the grouped LUTs using common addresses. Accordingly, address control on a plurality of LUTs may easily be performed group by group.

The address control method may be performed by a computer that executes a program prepared in advance. The program may be stored in a computer-readable recording medium such as a hard disk, flexible disk, CD-ROM, MO, or DVD and read out of the recording medium and executed by the computer. The program may be distributed over a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An address controller comprising:
   a plurality of lookup tables configured to hold values corresponding to a plurality of addresses;
   a similarity detector configured to detect similarity between the plurality of lookup tables and to group similar lookup tables among the plurality of lookup tables; and
   a controller configured to read the values out of the plurality of lookup tables grouped by the similarity detector, using address control information common to grouped lookup tables.

2. The address controller according to claim 1, wherein the controller increases addresses to be assigned to a range in which the values in the lookup tables widely vary.

3. The address controller according to claim 1, wherein the similarity detector performs normalization using the maximum values stored in the plurality of lookup tables and detects the similarity between the plurality of lookup tables.

4. The address controller according to claim 1, wherein the similarity detector detects the similarity between the plurality of lookup tables using a part of the values stored in the plurality of lookup tables.

5. The address controller according to claim 1, wherein the similarity detector detects the similarity between the lookup tables by an error calculation or a correlation calculation between states of the values that vary with respect to the plurality of addresses.

6. The address controller according to claim 5, wherein the similarity detector detects the similarity by comparing a correlation value obtained by the correlation calculation or an error value obtained by the error calculation to a threshold value.

7. The address controller according to claim 1, wherein the controller uses, as reference addresses, addresses in one of the plurality of lookup tables grouped by the similarity detector to read values out of the remaining plurality of lookup tables grouped by the similarity detector.

8. A transmitter comprising:
   a power amplifier configured to amplify power of a transmitted signal;
   a plurality of lookup tables configured to hold distortion compensation coefficients based on amplification characteristics of the power amplifier at a plurality of corresponding addresses;
   a similarity detector configured to detect similarity between the plurality of lookup tables and to group similar lookup tables among the plurality of lookup tables;
   a controller configured to read the distortion compensation coefficients out of the plurality of lookup tables grouped by the similarity detector, using address control information common to grouped lookup tables; and
   a predistortion unit configured to multiply the transmitted signal by the distortion compensation coefficients and outputs a result signal to the power amplifier.

9. The transmitter according to claim 8, further comprising:
an update unit configured to update the distortion compensation coefficients based on fed-back signals from the power amplifier and the transmitted signal and to store the updated distortion compensation coefficients in the plurality of lookup tables.

10. The transmitter according to claim 9, further comprising:
a plurality of delay units configured to delay signals for the plurality of addresses and the transmitted signal,
wherein the plurality of lookup tables are provided at a former stage of the plurality of delay units.

11. The transmitter according to claim 8, wherein the controller increases addresses to be assigned to a range in which the values in the lookup tables widely vary.

12. An address control method comprising:
detecting similarity, by a similarity detector, among a plurality of lookup tables that hold predetermined values corresponding to a plurality of addresses;
grouping, by the similarity detector, similar lookup tables among the plurality of lookup tables; and
reading values out of the grouped lookup tables using address control information common to the grouped lookup tables.

13. The address control method according to claim 12, further comprising:
increasing addresses to be assigned to a range in which the values in the lookup tables widely vary.

14. The address control method according to claim 12, further comprising:
performing normalization using the maximum values stored in the plurality of lookup tables and detects the similarity between the plurality of lookup tables.

15. The address control method according to claim 12, further comprising:
detecting the similarity between the plurality of lookup tables using a part of the values stored in the plurality of lookup tables.

16. The address control method according to claim 12, further comprising:
detecting the similarity between the lookup tables by an error calculation or a correlation calculation between states of the values that vary with respect to the plurality of addresses.

\* \* \* \* \*